(12) United States Patent
Maggiore et al.

(10) Patent No.: US 11,884,464 B2
(45) Date of Patent: Jan. 30, 2024

(54) CONTAINER WITH SUBDIVIDED SECTIONS CONTAINING LOCKED COMPARTMENTS UNLOCKING IN SEQUENCE

(71) Applicants: Sophia Maggiore, Stony Brook, NY (US); Frank Maggiore, Stony Brook, NY (US)

(72) Inventors: Sophia Maggiore, Stony Brook, NY (US); Frank Maggiore, Stony Brook, NY (US)

(73) Assignee: Frank Maggiore, Stony Brook, NY (US)

( * ) Notice: Subject to any disclaimer, the term of this patent is extended or adjusted under 35 U.S.C. 154(b) by 380 days.

(21) Appl. No.: 17/336,906

(22) Filed: Jun. 2, 2021

(65) Prior Publication Data

US 2022/0041353 A1 Feb. 10, 2022

Related U.S. Application Data

(60) Provisional application No. 63/033,791, filed on Jun. 2, 2020.

(51) Int. Cl.
| | |
|---|---|
| G08B 13/14 | (2006.01) |
| B65D 55/02 | (2006.01) |
| B65D 25/04 | (2006.01) |
| A47J 47/14 | (2006.01) |
| B65D 81/38 | (2006.01) |
| B65D 55/14 | (2006.01) |

(52) U.S. Cl.
CPC ............ *B65D 55/028* (2013.01); *A47J 47/14* (2013.01); *B65D 25/04* (2013.01); *B65D 55/14* (2013.01); *B65D 81/3813* (2013.01); *B65D 2203/10* (2013.01)

(58) Field of Classification Search
CPC ...... B65D 55/028; B65D 25/04; B65D 55/14; B65D 81/3813; B65D 2203/10; A47J 47/14
See application file for complete search history.

(56) References Cited

U.S. PATENT DOCUMENTS

| | | | | |
|---|---|---|---|---|
| 4,370,006 A | * | 1/1983 | Graef | G07D 11/125 232/15 |
| 10,435,937 B2 | * | 10/2019 | Savage | E05B 49/00 |
| 10,813,841 B2 | * | 10/2020 | Latorraca | G07F 17/0092 |

(Continued)

*Primary Examiner* — Quang Pham

(57) ABSTRACT

An assembly is provided. The assembly comprises of a container which may be a reusable or single-use container intended for the storage, transport, temperature regulation, modification, prevention of contamination, usage, removal, presentation, consumption, assembly, and/or the experience around food products contained inside of the plurality of locked compartments which are opened in a programmed sequence determined by a processing assembly device. The user of the container can utilize the contents of each of the container compartments as they are unlocked one at a time based on a preset sequence of events. These events may utilize sensor data to determine if a previous compartment is completely empty to send the command to unlock the next compartment in sequence. An administrator can set and/or override the sequence of the compartments to unlock from the container and program the rules for unlocking the container compartments.

16 Claims, 7 Drawing Sheets

(56) References Cited

U.S. PATENT DOCUMENTS

| | | | | |
|---|---|---|---|---|
| 11,666,167 B2* | 6/2023 | Dehner | ............ | G08B 13/19695 348/152 |
| 11,672,370 B2* | 6/2023 | Juhasz | ............... | G08B 13/1481 116/85 |
| 2002/0180580 A1* | 12/2002 | Gotfried | ................. | G07F 17/13 340/5.2 |
| 2003/0090364 A1* | 5/2003 | Cardinale | ............. | E05B 43/005 340/5.73 |
| 2009/0217714 A1* | 9/2009 | O'Leary | .................. | E05C 9/08 70/84 |
| 2011/0215898 A1* | 9/2011 | Ramos-Elizondo | ......................... | E05B 47/0012 340/5.2 |
| 2013/0030566 A1* | 1/2013 | Shavelsky | ................ | A61J 7/04 221/154 |
| 2015/0339466 A1* | 11/2015 | Gao | ........................ | G06F 21/31 726/16 |
| 2016/0186465 A1* | 6/2016 | Nelson | ................... | B65D 55/14 220/230 |
| 2017/0069148 A1* | 3/2017 | Gilbertson | ............. | G07C 9/257 |
| 2017/0215620 A1* | 8/2017 | Dade | ....................... | F25D 17/00 |
| 2017/0337507 A1* | 11/2017 | Curry | ................. | G07C 9/00182 |
| 2018/0158021 A1* | 6/2018 | Dautz | ............... | G07C 9/00896 |
| 2018/0223566 A1* | 8/2018 | Smith | ................. | E05B 73/0005 |
| 2018/0357843 A1* | 12/2018 | Zurkuhlen | ............. | G07F 17/12 |
| 2019/0111955 A1* | 4/2019 | Canoso | ................... | E05F 15/73 |
| 2019/0236553 A1* | 8/2019 | Maki | ................. | G07C 9/00563 |
| 2021/0174621 A1* | 6/2021 | Stevenot | ................. | H04W 4/30 |
| 2023/0032389 A1* | 2/2023 | Barros | ................. | B65D 55/028 |
| 2023/0189948 A1* | 6/2023 | Peterson | ............. | A45C 13/005 150/101 |
| 2023/0189953 A1* | 6/2023 | Dugoni | ................. | A45C 13/10 206/223 |
| 2023/0209022 A1* | 6/2023 | Bashkin | ............. | G07C 9/00896 705/28 |

* cited by examiner

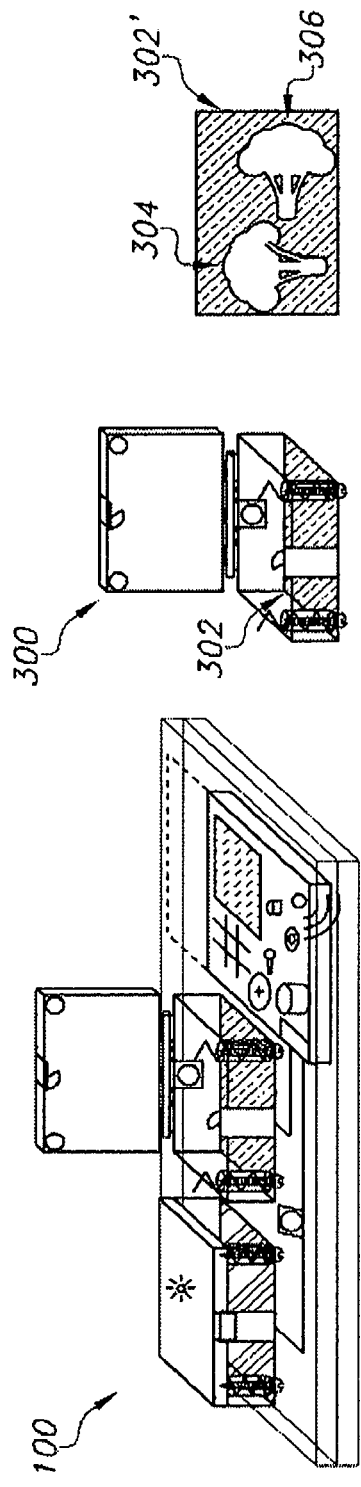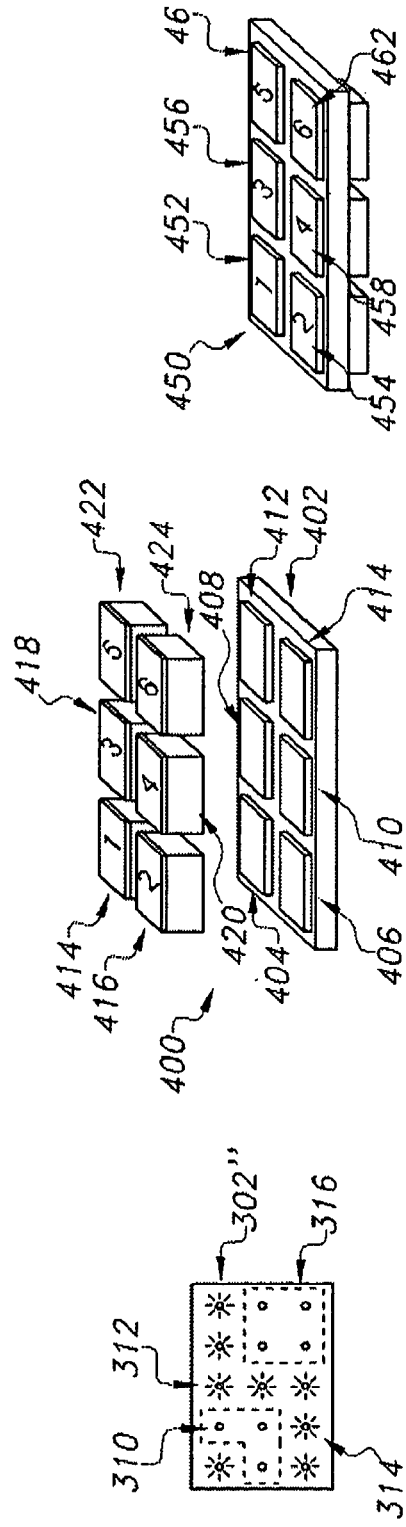

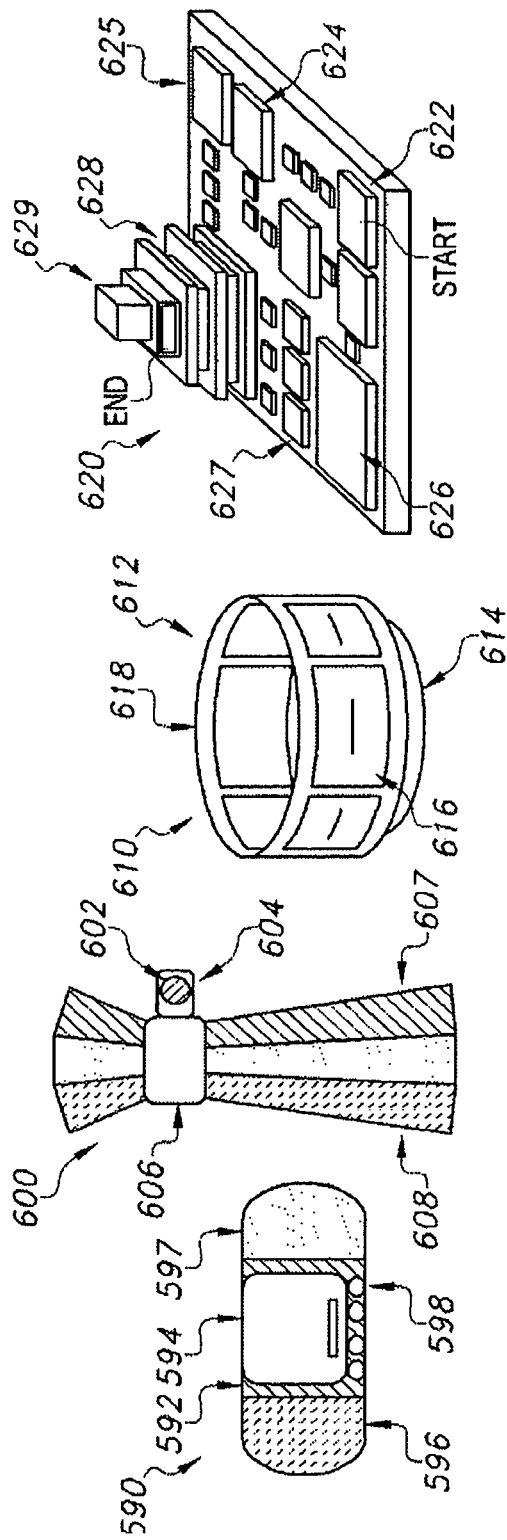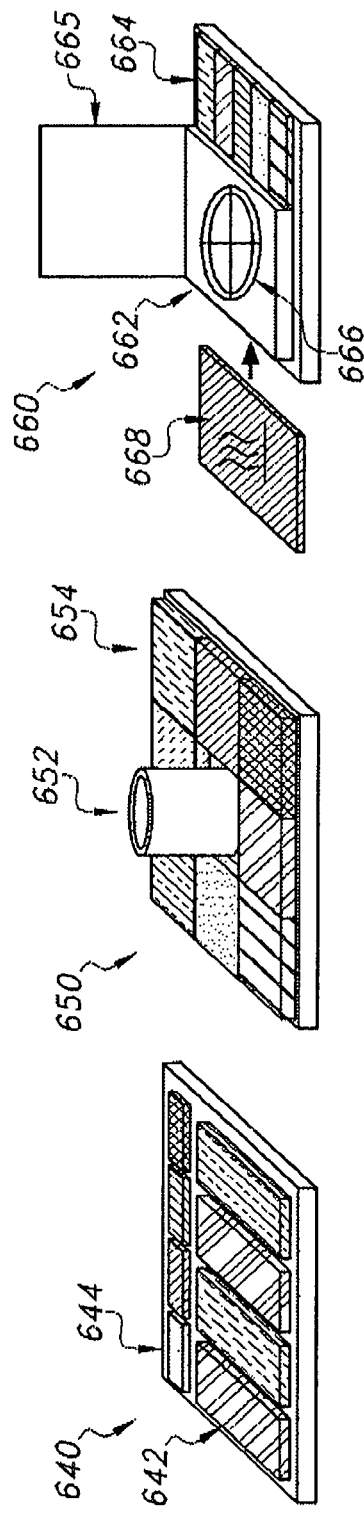

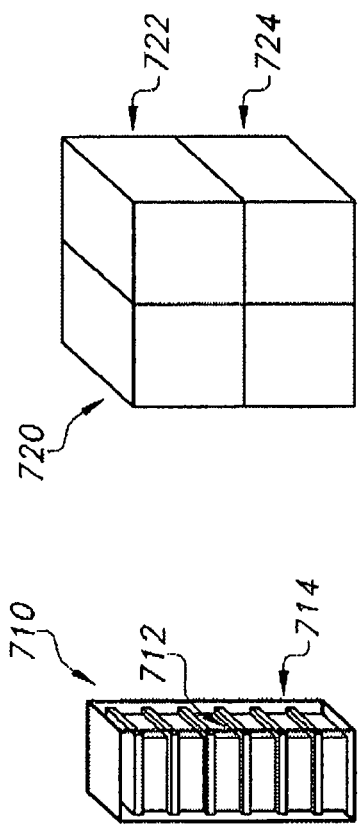
FIG. 3C
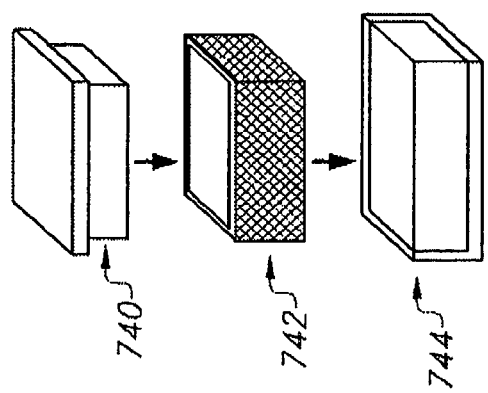
FIG. 3B
FIG. 3E
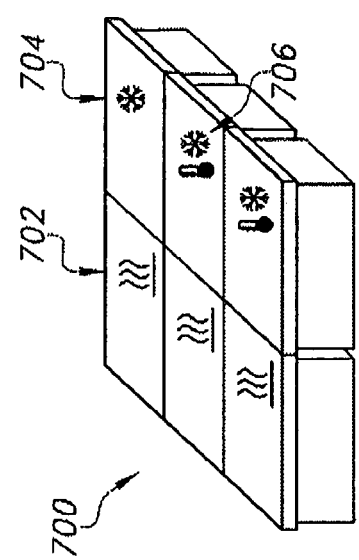
FIG. 3A
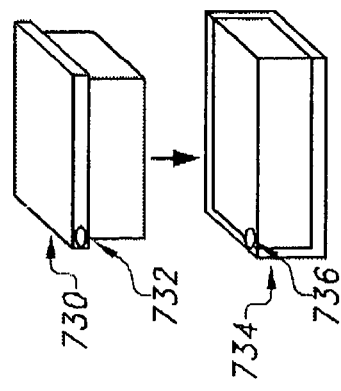
FIG. 3D

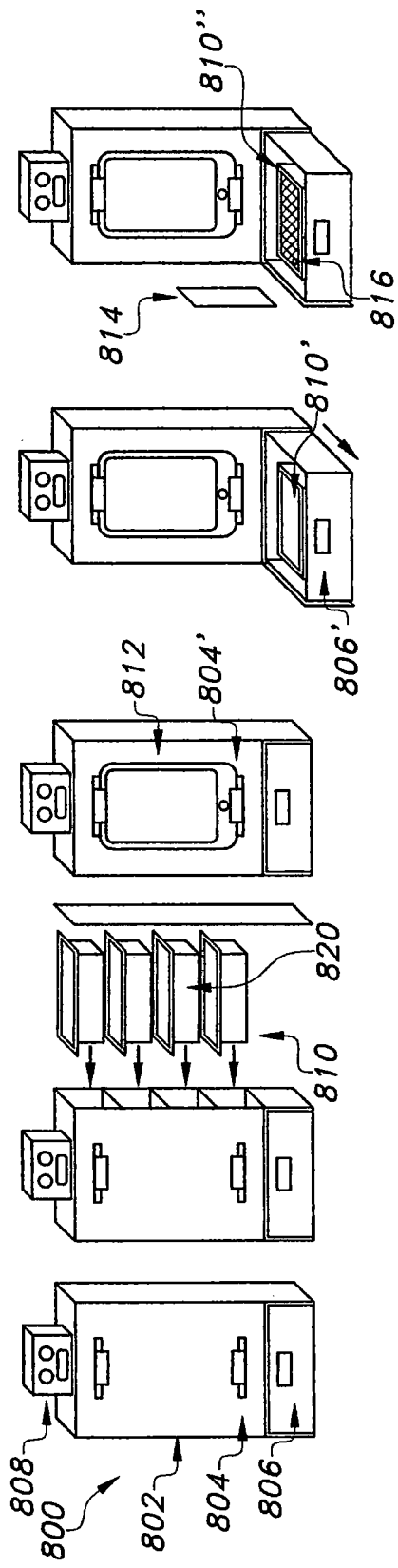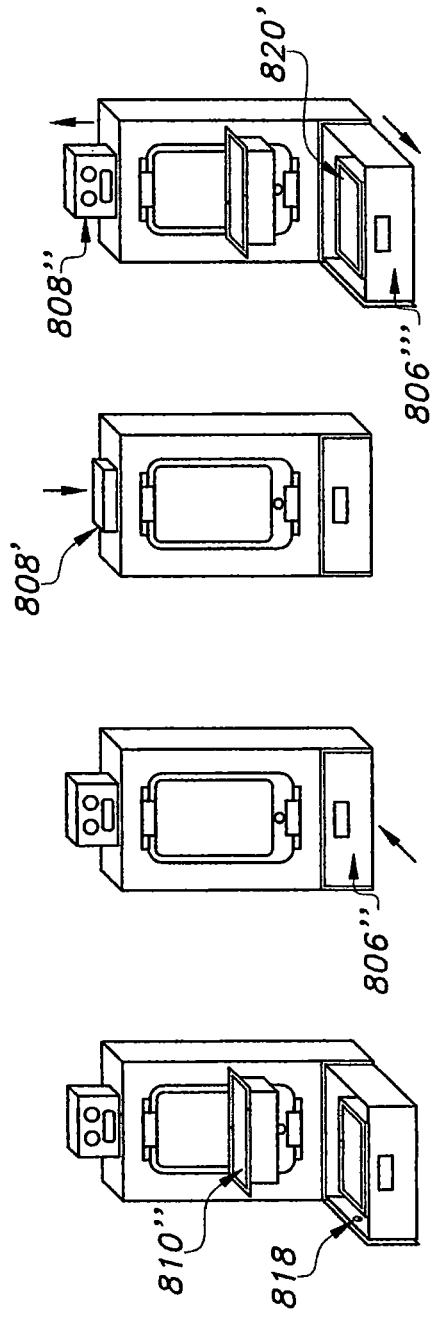

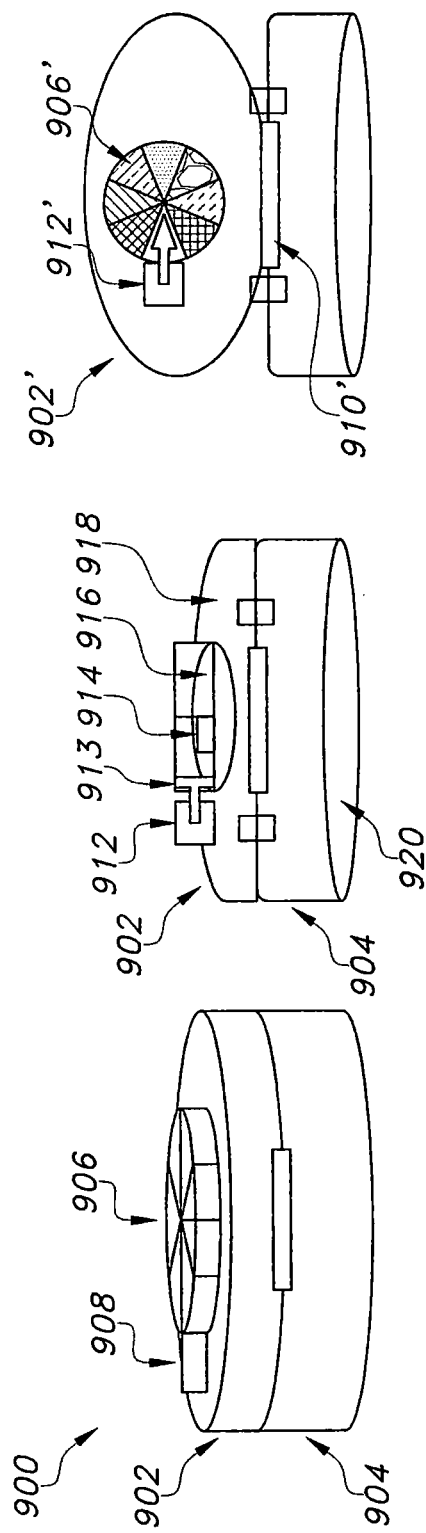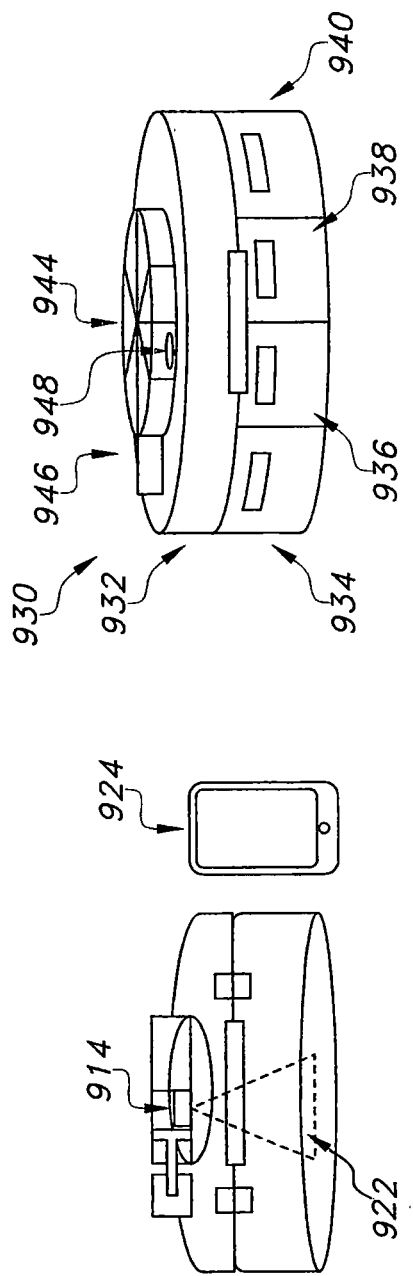

CONTAINER WITH SUBDIVIDED SECTIONS CONTAINING LOCKED COMPARTMENTS UNLOCKING IN SEQUENCE

CROSS-REFERENCE TO RELATED APPLICATIONS

This Application claims the benefit of U.S. Provisional Application No. 63/033,791, filed on 2 Jun. 2020, which is incorporated in its entirety by this reference.

TECHNICAL FIELD

The application relates to a container assembly which may be a reusable or single-use container intended for the storage, transport, temperature regulation, modification, prevention of contamination, usage, removal, presentation, consumption, assembly, and/or the experience around utilizing the materials contained inside of the plurality of locked compartments which are opened in a programmed sequence determined by a processing assembly device.

BRIEF DESCRIPTION OF THE FIGURES

FIGS. 1A-1G are schematic representations of an example of a container assembly containing locked compartments to gamify the eating of healthy foods and healthy behaviors of eating the food;

FIGS. 2A-2K are schematic representations of exemplary container assembly designs;

FIGS. 3A-3E are schematic representations of exemplary packaging for the pre-packaged containers to be inserted into the unit compartments;

FIGS. 4A-4I are schematic representations of the dispensing unit utilizing pre-packaged containers for utilizing locked compartments; and FIGS. 5A-5E are schematic representations of a dispensing unit where the compartment unlocks and opens from inside of the unit primary container.

BACKGROUND

Figure 1A:
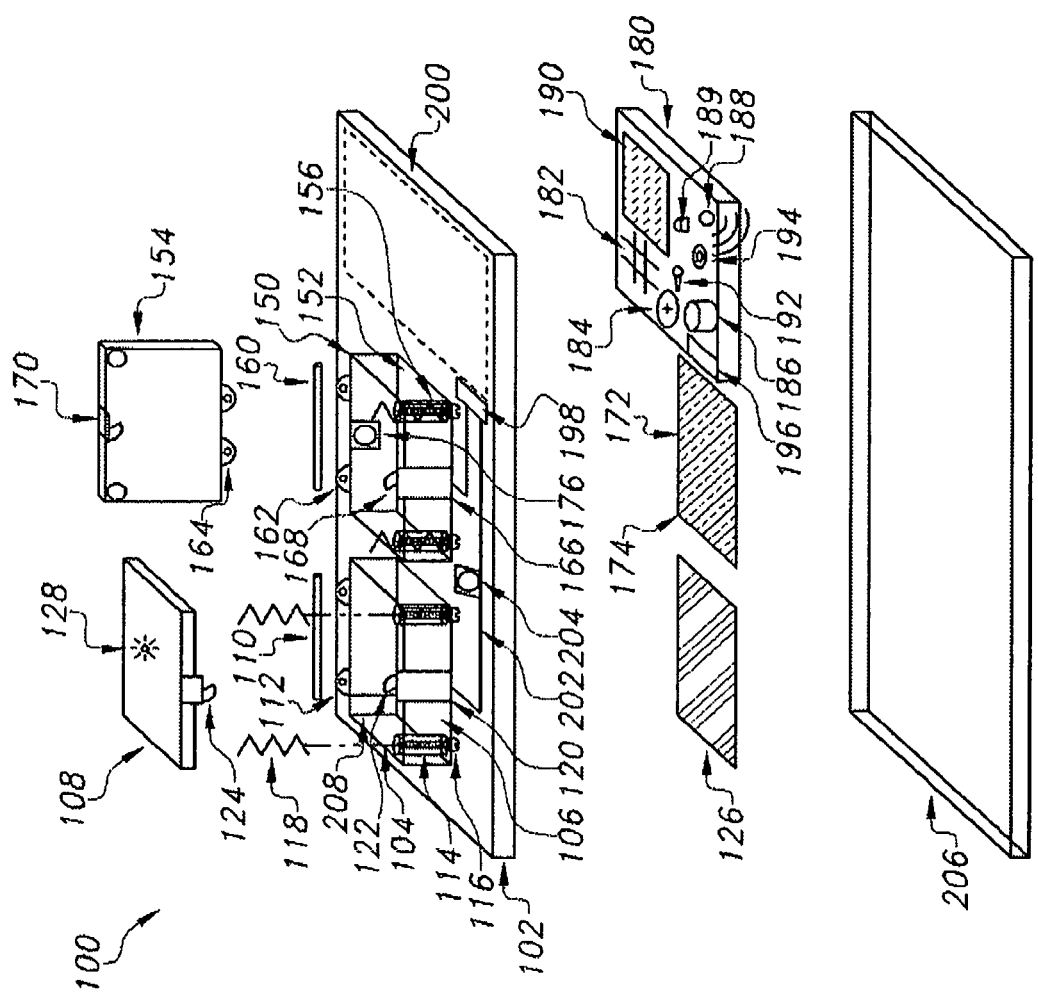

The container assembly is intended to prevent the user from accessing the compartments until a programmed set of conditions is accepted by a processing device to send a command to unlock the next locked compartment. The container assembly may require the at least one user to complete a series of tasks in a gamified manner to unlock the plurality of locked compartments in a specific programmed sequence. In the primary embodiment at least one initial compartment in the container assembly is in the unlocked state, when all of the materials have been removed from this unlocked compartment a sensing device communicates the absence of the material to a processing assembly device which makes a decision to unlock the next compartment in the programmed sequence of compartments to open. In other embodiments the container assembly processing device makes a decision to unlock the next compartment based on an input from the user, a directed action from an external input device, or an internal decision by the processing assembly device such a default of which compartment is the initial compartment to unlock and/or the use of a timer to unlock the next compartment.

The primary embodiment for the container assembly is for the consumption of food, food products, toppings, flavors, as well as food accessories such as utensils, drinks, vitamins, prizes and/or rewards. Such containers assemblies may be preferably formed from a material meeting the requirements for food safety including but not limited to a plastic material such as PET, PETE, HDPE, LDPE, polypropylene, or polystyrene; a metal material such as stainless steel or aluminum; a food safe wood material such as bamboo; a ceramic or glass material such as Pyrex®; a rubberized material such as silicone; for single-use container assemblies the materials may be paper, Styrofoam®, starch based, or biodegradable bioplastics; and/or a combination thereof. The container assembly may take a plurality of shapes such as a rectangle, cube, bowl, pyramid, sphere, cylinder, or other complex shapes. The container assembly may contain handles like a food tray to make it easier to carry. The container assembly may be stored in a refrigerator or freezer to preserve the food inside or it may be heated in a microwave, oven, stovetop, water bath, and/or steamer to heat or cook the food within. The container assembly may consist of a frame where multiple compartments holding different materials are inserted into the frame. The container assembly may contain a plurality of subdivided sections which may be formed in a plurality of shapes, sizes, depths, and dimensions. The subdivided sections may hold different food types based on their shape and size such as solid foods, liquids, semi-solids, gases, and/or food accessories to enhance the food such as condiments, herbs, spices, dips, or sauces. The subdivided sections may be individually heated and/or cooled using an insert within the compartment. The individual sections may be separated by au insulating material to prevent an adjacent compartment which is heated to affect the temperature of the adjacent compartment which may be cooled. Each subdivided section may contain at least one locked compartment. This locked compartment may utilize a locking mechanism such as a latch, hook, magnet, or other attachment mechanism which would keep the compartment firmly closed until it is unlocked based on an action by a user and/or an external input.

The at least one locked compartment in the container assembly may be unlocked and opened based on an action by the user and/or an external input. The function which results in the unlocking of at least one compartment may be based on the purpose of the container assembly. In one embodiment the purpose of the container assembly is to help children to eat healthy portion sizes of vegetables, fruits, and other healthier foods before unlocking and getting access to more desirable, better tasting, or higher calorie foods. In this embodiment the container assembly may contain a plurality of sensors, such as light sensors or a camera, which may detect if the sensors are covered by food in the compartment obstructing the sensing of light. The sensors may be connected to a processing device assembly which may be internal, integrated within, removable from, and/or external to the assembly. This processing device assembly may contain at least one processing device, at least one power device such as a rechargeable battery, at least one memory storage device, and at least one communication device. This processing device assembly may be connectable to the container assembly through a watertight cable connection, an inductive connection, and/or wirelessly. The processing device may alternatively be an external mobile device which is connectable to the container assembly. Once the user eats all of the food in that subdivided section of the container all of the light sensors in that section can detect light in the absence of all the food which was removed from the compartment subsection and eaten. This would then send a signal to a processing device to unlock a different compartment which may contain more desirable food such as bread, meat, or dessert as a reward. In alternate embodiments the unlocked compartment may contain a toy or other prize as a reward. A number of alternate embodiments for the purpose of the container assemblies are possible which include but are not limited to portion control, fun or entertainment, rewards for group healthy eating habits, quiz questions or teacher run challenges, food challenges, enhanced food experiences, randomized food experiences, sensory food experiences, gamification of eating/drinking, and/or the delivery or vitamins. Each of these alternate embodiments may have their own design, sensor devices, and/or inputs to unlock the compartments.

SUMMARY

According to one aspect, a container is provided. The container comprises:

At least one formed enclosure and/or well containing at least one side wall and at least one bottom with at least one open top, which may be subdivided into multiple subsections, wherein the at least one enclosure and/or is covered by at least one locked compartment assembly making the enclosure and/or well inaccessible to the user until the lock compartment assembly is opened; wherein the at least one locked compartment assembly consists of at least one attachment mechanism which is unlocked to make the formed enclosure and/or well accessible after the user performs a predetermined action and/or from an external input.

According to another aspect, the container comprises of at least one sensor device; at least one processing assembly device comprising of at least one processing device, at least one power device such as a rechargeable battery device, at least one memory storage device, and at least one communication device; and at least one locking mechanism device Where the processing device may make a decision to unlock a specific lock compartment assembly after a predetermined action and/or external input is performed.

DESCRIPTION OF THE EMBODIMENTS

In the following text, a detailed description of examples will be given with reference to the drawings. It should be understood that various modifications to the examples may be made. In particular, one or more elements of one example may be combined and used in other examples to form new examples.

A container assembly is utilized for the storage, transport, temperature regulation, protection, prevention of contamination, and presentation for the materials inside. The container assembly described in this invention is intended to hold at least one material inside of the compartments such as food products, food accessories such as utensils, drinks, vitamins, supplements, medications, and prizes/rewards. The container assembly contains a mechanism to lock the materials inside of the compartment chambers and keep them locked until at least one event occurs, and the compartment chambers are unlocked in a predefined sequence based on the programming and the events. The purpose of the invention is to enhance the experience around accessing and using the materials inside of the plurality of locked compartments in a gamified manner wherein at least one user must complete tasks to unlock.

The containers assemblies may be preferably formed from a material meeting the requirements for safely storing the relevant materials inside, such as meeting food grade requirements for food-based materials stored in the container compartments, pharmaceutical compatibility for medications, drug products, or chemicals requiring certain compartment container material compatibilities, and/or materials for other materials or items relevant for local requirements and regulations. Such materials for the construction of the container assemblies, compartments, and/or container assembly frames, include but are not limited to plastic materials such as PET, PETE, HDPE, LDPE, polypropylene, or polystyrene; metal materials such as stainless steel or aluminum; food safe wood materials such as bamboo; ceramic or glass materials such as Pyrex®; rubberized materials such as silicone; for single-use container assemblies the materials may be paper, cardboard, Styrofoam®, starch based, biodegradable bioplastics; and/or a combination thereof.

The container assembly may take a plurality of shapes such as a rectangle, cube, bowl, pyramid, sphere, cylinder, or other, complex shapes. The container assembly may contain handles like a food tray to make it easier to carry. The container assembly may be stored in a refrigerator or freezer to preserve the food inside or it may be heated in a microwave, oven, stovetop, water bath, and/or steamer to heat or cook the food within. The container assembly may consist of a frame where multiple compartments holding different materials are inserted into the frame. The container assembly may contain a plurality of subdivided sections which may be formed in a plurality of shapes, sizes, depths, and dimensions. The subdivided sections may hold different food types based on their shape and size such as solid foods, liquids, semi-solids, gases, and/or food accessories to enhance the food such as condiments, herbs, spices, dips, or sauces. The subdivided sections may be individually heated and/or cooled using an insert within the compartment. The individual sections may be separated by an insulating material to prevent an adjacent compartment which is heated to affect the temperature of the adjacent compartment which may be cooled. Each subdivided section may contain at least one locked compartment. This locked compartment may utilize a locking mechanism such as a latch, hook, magnet, or other attachment mechanism which would keep the compartment firmly closed until it is unlocked based on an action by a user and/or an external input.

The at least one locked compartment in the container assembly may be unlocked and opened based on an action by the user and/or an external input. The function which results in the unlocking of at least one compartment may be based on the purpose of the container assembly. In one embodiment the purpose of the container assembly is to help children to eat healthy portion sizes of vegetables, fruits, and other healthier foods before unlocking and getting access to more desirable, better tasting, or higher calorie foods. In this embodiment the container assembly may contain a plurality of sensors, such as light sensors or a camera, which may detect if the sensors are covered by food in the compartment obstructing the sensing of light. The sensors may be connected to a processing device assembly which may be internal, integrated within, removable from, and/or external to the assembly. This processing device assembly may contain at least one processing device, at least one power device such as a rechargeable battery, at least one memory storage device, and at least one communication device. This processing device assembly may be connectable to the container assembly through a watertight cable connection, an inductive connection, and/or wirelessly. The processing device may alternatively be an external mobile device which is connectable to the container assembly. Once the user eats all of the food in that subdivided section of the container all of the light sensors in that section can detect light in the absence of all the food which was removed from the compartment subsection and eaten. This would then send a signal to a processing device to unlock a different compartment which may contain more desirable food such as bread, meat, or dessert as a reward. In alternate embodiments the unlocked compartment may contain a toy or other prize as a reward. A number of alternate embodiments for the purpose of the container assemblies are possible which include but are not limited to portion control, fun or entertainment, food challenges, enhanced food experiences, randomized food experiences, sensory food experiences, gamification of eating/drinking, and/or the delivery or vitamins. Each of these alternate embodiments may have their own design, sensor, devices, and/or inputs to unlock the compartments.

The compartments of the containers may be unlocked within a preprogrammed sequence. In the primary embodiment this can result in the vegetables to be eaten first, followed by foods which are primarily starches (such as rich, potatoes, or pasta), followed by meats or the main portion of the food, followed by the snack or dessert. The sequence of compartments within the containers unlocking and opening may alternatively confer the sequence selected by the administrator using default or custom programmed settings or rules, such as the snack or dessert container only unlocks if the other containers are consumed within a pre-defined time range.

The sensors utilized within the container assembly may be simplistic light sensors, a photodiode light sensor/detector, an acoustic sensor for determining the volume of material inside the container, cameras and/or a plurality, arrays, or combinations of the sensors thereof which can determine if the item covering the sensor is still present. When the object is removed from the compartment the light sensor observes the ambient light in the room and can unlock the next compartment in the pre-programmed sequence. The top of the container, may additionally contain a light blocking and/or light filtering material which blocks the light when in a closed state. The sensors may communicate with a processing device which may be internal or external to the container unit. The sequence of the container opening may alternatively be manually controlled and/or overridden by an administrator to the system, which in the primary use case may be a parent that is overriding the sequencing of unlocking additional compartments within the sequence and preventing a child from simply removing the food from the compartment and not eating it, until the full contents of the individual compartments are fully consumed. Additional controls such as timers, monitors, and alarms may be utilized as part of the pre-programmed sequential process. In certain situations, the administrators or parents may program the container to provide an audible alarm if the contents of a single container are not completely removed within a determined time period. There may also be a timer if the contents of an initial compartment are not completed within a defined timeframe it will not unlock some or all of the most desirable compartments in the container. If the user takes the container to an alternate location such as a school cafeteria away from the home and the supervision of the parent, they can get remote reports with metrics on the time it took to open each compartment in the container and the amount of time they spent working on each individual compartment.

The primary purpose of the unlocking of the sequence of compartments is to promote healthier eating habits, get children used to eating healthier foods, or to try different foods that they would not normally eat, to provide portion control and to prevent obesity through the training of healthier eating habits. The container provides immediate incentive to completely complete the contents in one compartment before moving onto the next compartment which may have something more desirable located inside for the user of the container.

The person loading the items into the compartments, which in food embodiments with children may be the parent or guardian (the administrator), can set the sequence that the compartments open as they install the food into the different compartments which can be home-made foods and/or pre-packaged foods in individualized containers, where they could select one of the default sequences (left to right or top to bottom), a custom sequence, or they can use an app on a mobile device to program, control, alter the sequencing or the rules for sequencing. In an alternate embodiment for children working as a group, such as in a video chat where they eat together during virtual lunch, the parents (administrators) can work as a group to set the preferred eating habits for their own children to prevent them from eating too fast, or too slow, or to eat all of the food in the containers. There could be a bigger reward, such as a virtual currency in their favorite shared online game if all of the children follow the proper eating habits for the individuals and complete it together as a group. This reinforces the children to use peer pressure in a positive way to ensure all are following the proper eating habits so they can all receive rewards as a group that is greater than the basic rewards as an individual. The administrator may receive a report at the end of each meal detailing the metrics on the time it takes to eat each container in the sequence, how much was eaten, if there were pauses in between, and did they meet the goals for healthy eating habits. These metrics can be graphed over the course of weeks and months and be provided to health care providers or nutritionists trying to institute healthier eating habits early on.

In alternate embodiments a teacher in a classroom may use an application or school rewards program to unlock rewards included in a container system loaded into the unit by the child's own parents or guardians to ensure that the reward fits what each parent wants to provide as a reward. This includes ensuring it fits with the child's eating habits, daily caloric intake or any potential food allergies, if the rewards are food based. This would allow teachers to reward children in class for good behavior, achieving a certain score on a test, for acts of kindness, or for some other activity that promotes good behaviors by unlocking the containers of pre-determined prizes that the parents themselves provided.

In alternate embodiments the containers may be utilized for a gamifying the unlocking of compartments for access to desirable contents or opening less desirable contents for failing to meet the requirements of the game. This may include but is not limited to games, food challenges, competition between friends, gamified food experiences, and/or cooperative gaining for a entertainment such as trivia questions, races to finish foods in a certain sequence first, providing certain mystery ingredients for the creation of a dish, such as a pizza challenge or Fondue/Fon-don't where the contents may be appetizing or unappetizing based on correctly answering questions or from being selected at random, Lazy Susan spin challenge for the opening of compartments with different appetizers, or guessing the flavor or food type from the taste. Intricate board game experiences can be built out of more complex containers with designs and preprogrammed sequences which can make the dining experience into a choose-your-own-adventure boardgame.

For higher end experiences the container compartments may unlock to provide experiential dining such as the including a variety of enhancers for the food which may include complementary smells, food item pairings, different textures, sounds, visual enhancements, lighting, and other features to provide a better experience for eating the food or using the contents of the containers in a sequential way. In these adult experiences a user may play a choose-your-own-adventure game by answering questions, having food challenges, and making decisions along the way for higher end experiences and different food varieties. Other part of the experiences such as projection mapping over the containers, augmented reality or virtual reality experiences, smells, textures, and flavor additives may be added to enhance the sensory experience of dining. This will help the experience around eating to make it more social or to provide an interactive experience in a restaurant that could not be easily provided at home.

Food companies, such as those in the prepackaged food market, can provide prepackaged food in containers that are easily loaded into the compartments and locked into place within the system. These pre-packaged foods may be available in packs that have compartments which can be mixed and matched depending on food type, dietary restrictions, and meal preferences. These may include foods with the proper daily nutrition, portion size, and variety to keep the interest of the person eating the food. They may be stored at a common temperature such as in a refrigerator or freezer for storage and then separated when removed from storage for heating or allowing to sit at room temperature. The packaging may contain clear indications with clear labeling if the food in the prepackaged container contains items that need to be microwaved or heated, if they need to be left out to room temperature, or if they need to be insulated to be kept cool. The pre-packaged food containers may contain thermal insulation to keep the food at the desired temperature by the time the person consuming the food is going to eat it. Either by waiting until the time to initiate the sequence of eating or the duration of time it takes to open the compartment with the contents for eating. The pre-packaged food containers may additionally contain disposable sensors or materials to assist in the use of the sensors so that the system can determine when a full pre-packaged container is loaded into a compartment slot, when the pre-packaged container is unlocked and opened, when the food in the pre-packaged container is opened (such as if the sealed top lid is peeled back), when the food inside of the pre-packaged container is completely consumed, and when the pre-packaged container is removed from the compartment to be discarded/recycled. The pre-packaged food may also contain physical rewards such as a toy and/or virtual rewards that can be entered in using scanning or entering in code on the packaging of the containers.

FIG. 1A is a side view of an exploded diagram of a container assembly 100 containing multiple compartments 104 and 150 which have at least one cover on top 108 and 154 which locks materials inside of the container in place until an action is performed to unlock the containers. The container assembly too has a base 102 which in this embodiment is formed from a food compatible plastic material. The base contains two compartments 104 and 150 formed with at least one side wall and at least one bottom 106 and 152. The at least one bottom 106 and 152 is transparent to allow the sensing devices 126 and 172 to detect the presence of the materials inside of the compartments 104 and 150. In this embodiment the first compartment 104 contains at least one side wall and at least one bottom 106. A top cover 108 is attached to the compartment 104 via an attachment device which in this embodiment is a rod or pin no which goes through a swivel attachment 112 connected to the base 102 and to a swivel attachment (not shown in this angle) on the top cover 108 where the top cover 108 may be opened and closed over compartment 104 providing access to the contents within the compartment when in the open state. In this embodiment the second compartment 150 also contains at least one side wall and at least one bottom 152 where the top cover 154, which is shown in the open state position, is attached to the compartment 150 via a rod or pin 160 which goes through a swivel attachment 162 connected to the base 102 and to a swivel attachment 164 which is connected to the top cover 154. To help assist with the opening of the top cover 108 and 150 the container assembly too contains at least one opener assembly which in this embodiment is a spring opener assembly which is available on either side of the front of compartment 104 or compartment 150 within the base 102. The spring assembly for compartment 104 comprises of at least one well 114, at least one screw 116, and at least one spring 118. The at least one well 114 holds the at least one screw 116 and at least one spring 118 in place. The at least one screw 116 may hold the at least one spring 118 in place with at least one washer (not shown) and may secure the at least one well 114 to the base 102. The spring assembly 156 for compartment 150 may contain the same components as described for spring assembly 114 for compartment 104. For compartment 104 when the action is completed to unlock the locking assembly 120 from the top cover 108 the at least one spring 118 may push the top cover 108 open. For compartment 150 when the action is completed to unlock the locking assembly 166 from the top cover 154 the at least one spring in spring assembly 156 may push on the corresponding spring slot 158 on the top cover 154 to cause it to open. In alternate embodiments the top cover 108 may simply be unlocked and removed from the top of the container assembly 100 by the user without the use of hinges, springs, or other mechanical devices. The opening of the top cover may visibly and audibly inform the user that the compartment is open and now accessible, that the previous task was completed, and the next set of steps are now in progress, and to show the contents inside of the compartment 104. The lock assembly 120 may utilize multiple attachment devices such as at least one latch, hook, magnet, or other attachment mechanism to keep the top cover 108 securely enclosed over compartment 104 to prevent any tapering or, prematurely opening of the compartment. In this embodiment the lock assembly contains a simple hook-to-hook locking mechanism where the primary hook 122 within the lock assembly 120 may be moved (pulled down) a certain number of degrees which releases the lock from the stationary hook 124 on the top cover 108. The movement of the primary hook 122 may be performed with a motor, linear actuator, or pully mechanism. This is the same for compartment 150 where lock assembly 166 has a primary lock hook 168 and a stationary lock hook 170 on the top cover 154. After the lock assembly 120 is in the unlocked state the at least one spring 118 in the opening assembly will cause the top cover 108 to pop open. In this embodiment there is at least one display device, which in this embodiment is at least one light emitting diode (LED) device 128 in the top cover 108 which may be used to inform the user that the top cover is open, which is particularly useful for embodiments of the container assembly too where the opener assembly is not present to pop open the top cover 108. In alternate embodiments the at least one display device may be a speaker which informs the user through an audio display which compartment is open, a window display which opens to reveal a text or image of what is in the container compartment 104, an LED array which provides a digital text or image, a digital screen such as an LCD display which may provide text, images, videos, or 3D content, a haptic display, an augmented reality, virtual reality, or mixed reality marker which may provide a display for an external mobile device, or other display type.

At least one sensing device is utilized to detect the presence of material inside of the compartment. The compartment 104 bottom 106 may be transparent to allow light from above the container to be transmitted through the bottom and/or sides of the container where at least one sensing device is present when the compartment is in the opened state. In this embodiment a light sensor array 126 device is used to detect the presence of light not being covered by the food inside. If the compartment 104 is in the open state and there is an expected range of ambient light then the light sensor array may detect limited to no blockage of light if all of the materials inside of the container compartment have been removed. A photosensor 189 may be available on the processing device assembly 180 and/or the external part of the container assembly 100 base 102 to detect the ambient light in the room as a baseline and measure that against the light detected by the light sensor array 126. In alternate embodiments a sensor array 172 of multiple light detectors 174 may be utilized to detect the presence of materials in the compartment including but not limited to a photocell light sensor, a photodetector, a light dependent resistor (LDR), a camera or other light detecting device. If there are materials within the compartment, such as food, then the light sensors would be blocked and would not be able to detect light against a standard value resulting in not sending the command to unlock the next compartment After all of the contents of the compartment are removed then the at least one sensing device detects the light above at a certain rate within a specified degree of error and unlocks the next compartment in the series. To reduce the amount of ambient light from reaching the internal light sensors 126 and 172 the container assembly 100 base 102 and the bottom enclosure 206 may be darkened to prevent external light not coming from above the compartment from reaching the sensors. In alternate embodiments at least one camera 176 may be mounted into at least one side wall, at least one bottom 152, or at least one top cover 154. This at least one camera 176 may use computer vision and machine learning to detect the presence of or the removal of materials from the compartment. In alternate embodiments at least one camera 204 may be mounted onto the base 102 of the container assembly 100 to monitor the actions of the user. In certain use cases this at least one camera may be utilized as an input device. In alternate embodiments it may be utilized to image, video, and/or record the user and what they are doing with the materials being removed from the compartments. In an exemplary use case where a parent sends a child to school or camp with such a container assembly 100 as a food monitoring device where the at least one camera 204 facing the user may record images at a specified interval, video clips, or a full video stored to the internal memory of the device (not shown) and/or a streaming video transmitted through a communication device (not shown) where the video may be viewed live remotely and/or stored in a cloud service. This may be utilized in this exemplary use case to ensure the child is actually eating the food in the compartments instead of simply removing the healthier, less desirable food from the compartments and simply discarding it. The decision to unlock the lock assembly 120 and 166 are made by the processing device assembly 180. The processing device may be internal, integrated within, removable from, and/or external to the container. The processing device assembly 180 may contain at least one processing device 182, at least one power device 184 such as a rechargeable battery or other power source, at least one memory storage device 186, and at least one communication device 188. An ambient light sensor device 189 may be utilized to detect the ambient lighting in the room to compare it to the lighting levels Observed by the sensor devices 126, 172, 176 and 204. In alternate embodiments the at least one processing device assembly 180 may contain one or more of the following, a display device such as a visual display, LED, LED array, LCD display screen, OLED display screen, augmented reality, virtual reality, holographic, or mixed reality display, an audio display such as a speaker device 194, a haptic display device, or other display type; an input device such as at least one button, at least one keyboard, at least one touchscreen display, at least one microphone 192, at least one controller, at least one joystick, at least one motion controller, at least one depth scanner, and/or at least one external input device. This processing device assembly 180 may be connectable to the container assembly through a watertight cable connection, an inductive connection, and/or wirelessly. The processing device assembly 180 may alternatively be an external mobile device such as a smart phone, tablet, or other mobile device which may be removably connectable to the container assembly. The processing device assembly 180 may be connected to the wiring 202 inside the container assembly 100 for power, data, and communication to the at least one sensor devices 126, 172, 176, and 204 and the at least one lock assembly 120 and 166. The connection from the processing device assembly 280 to the wiring inside of the container assembly 100 may be a watertight connection, an inductive connection on the processing device 196 and an inductive connection on the container assembly 198, a wireless connection, an infrared connection, or other connection type. The processing device assembly 180 may be encased in a watertight enclosure (not shown) when inserted into the container assembly 100. The enclosure (not shown) for the processing device assembly 180 may have a transparent window (not shown) for viewing at least one display device 190. The base 102 of container assembly 100 may contain a transparent window and/or area 200 where the at least one display device 180 on the processing device assembly may be viewed. The transparent window and/or area 200 may be formed from a material or have the required thickness for a touch screen display to be used on the processing device assembly 180 particularly if the processing device assembly is an external mobile device which is removably attachable to the assembly. The bottom enclosure 206 for the container assembly 100 may contain a gasket or seal (not shown) to be a watertight enclosure preventing food, liquids, or other materials from entering into the electronics containing portion of the container assembly 100. In embodiments where the processing device assembly 180 is removably attached to the container assembly 100 the bottom enclosure 206 needs to have a removable attachment device to temporarily connect it to the bottom of the container assembly 100. This would allow for the processing device assembly 180 to be removed prior to washing, cleaning, or immersing the container in a fluid. In other embodiments where the processing device assembly 180 is internal to the container assembly 100 the bottom enclosure 206 may be permanently sealed or formed where it cannot be opened providing the processing device assembly 180 with a waterproof and/or watertight enclosure where the electronics in the processing device assembly 180, the wiring 202, sensor devices 126, 172, 176, and 204 are made of materials rated to survive high temperatures from repeated washing in a dishwasher. Inside of compartment 104 may be a material modifier device 208 which is a device that alters the properties of the materials inside of the compartment, such as with a mixing element, an impeller, a material injection element such as for the injection of a compressed gas like carbon dioxide ($CO_2$) for carbonation or Nitrogen ($N_2$) for material/food preservation, for adding materials such as foams, creams, sauces, bubbles, aromatics, additives for emulsification, gelification, encapsulation, and/or spherification of the materials/foods, or other food enhancers such as whipped cream In alternate embodiments the material modifier device 208 may be utilized for precisely adding materials/foods in measured quantities with exact positioning along an X, Y, Z axis of control such as with using a pipette or syringe, or with a 3D printer inside of the compartment to print materials in a predefined design.

In this embodiment the opening of compartments in a sequence gamifies eating to help children or even adults eat a required portion of vegetables, fruits, or other healthy foods for people who have difficulty eating healthy. In this embodiment the container assembly 100 may be used by a child where the parent pre-loads the food inside of the compartments 104 and 105 within the container assembly 100 and determines the sequence they open. The first compartment 104 may be unlocked already, unlocked after a certain time period, or unlocked manually by the parent and/or, child. The child in this embodiment would need to eat all of the food in the first compartment 104, which may be vegetables, before they can unlock the next compartment 150, which may have more desirable foods such as bread, mashed potatoes, pasta, or macaroni. After the food in this compartment 150 is completely eaten then the compartment (not shown) containing the main course of meat, pasta, soup, or other food is unlocked. After the compartment (not shown) containing the main course is completed a reward compartment (not shown) is unlocked containing a food reward such as a cookie, a physical reward such as a toy locked in. an alternate compartment (not shown), or a virtual reward such as time on a mobile device, TV, or other gaming device, or virtual money for an application/game may be available as a reward for reinforcing the desired healthy eating behavior.

FIG. 1B is a side view of the container assembly 100' in the assembled state.

FIG. 1C is a side view of an unlocked and open compartment 300 with a light sensor array 302 at the bottom.

FIG. 1D is a top view of the light sensor array 302' which is covered by 2 pieces of food (broccoli) 304 and 306. The food is covering some of the light sensors in the light sensor array 302' which have a lower detection of the ambient light from above compared to non-covered light sensors.

FIG. 1E is a top view of the light sensor array 302" where the light sensors which are covered by the 2 pieces of food in View 'D' (broccoli) are shown as darkened where they are covered and are clear where the ambient light is detected. The darkened light sensors in group 310 correspond to the food piece 304 in View 'D'. The darkened light sensors in group $_3$16 correspond to the food piece 306 in View 'D'. The clear light sensors 312 are detecting the ambient light from the room. The light sensor 314 is partially covered by the food piece 304 obstruction in View 'D' and only partially detects the ambient light but at a lower rate than the unobstructed light sensors. The processing device assembly (not shown) may make a decision on if the reduction of light is due to a piece of food, is a partial obstruction, is a false positive, or is an acceptable level of leftover food which may cause a partial light obstruction in a few light sensors in the light sensor array 302".

FIG. 1F is a side view of a container assembly 400 which consists of a frame 402 where external compartments 414, 416, 418, 420, 422, and 424 may be inserted into openings in the frame 404, 406, 408, 410, 412, and 414. Each of the external compartments 414, 416, 418, 420, 422, and 424 may contain their own locking assembly which prevents the contents of the individual external compartments from being opened after they have been closed and locked. Each of the individual external compartment may be inserted into the corresponding opening. In some embodiments the frame may have a locking mechanism (not shown) to lock the external compartments 414, 416, 418, 420, 422, and 424 in place, either manually or through an electronic locking mechanism. The frame may accept external compartments of the same length and width but may vary in their height. In alternate embodiments the frame itself may be modular where the separator (not shown) between 2 or more compartment holders may be opened and/or removed from the frame to fit a larger external compartment (not shown) which occupies 2 or more of the spaces within the frame. The frame 402 may contain at least one processing assembly device (not shown) which may connect to the external compartments through a wired, waterproof wired, wireless, and/or inductive connection once the compartments are securely inserted into the frame openings. In at least one embodiment the ability to insert and/or remove the external compartments from the frame may allow the user and/or the administrator to reuse the locked containers. This is particularly the case for embodiments where the external containers have food as their contents where the external container remained locked and sealed.

FIG. 1G is a side view of the container assembly 450 where the compartments are opened in a defined sequence. The sequence may be pre-programmed in by default and/or an administrator, Which in some exemplary embodiments is a parent, may select the sequence of which compartments open after the previous compartment and what are the conditions for opening. The administrator may select which of the compartments are opened first and what sequence the compartments open as the material from the previous one is completely removed. The administrator may also program what conditions the processing device requires to make a decision to unlock the next compartment in the sequence, such as the removing all the material up to a certain percentage in at least one compartment which is detected by at least one sensing device (not shown) to open the next compartment in the sequence, needing to answer at least one question with an audio input which is detected by an audio input device, such as a microphone (not shown), to open at least one second compartment, to complete a game to open at least one third compartment, to complete watching a video to open at least one fourth compartment, to listen to an audio clip to open at least one fifth compartment, and to wait a certain time period to open at least one sixth compartment. In this embodiment container assembly 450 has six compartments which open in a sequence of labelled compartment numbers compartment one 452, compartment two 454, compartment three 456, compartment four 458, compartment five 460, and compartment six 462. The compartments may by default open the compartments in sequence 1 through 6 or they may be programmed by an administrator for some other sequence such as compartment six 462, compartment four 458, compartment two 454, compartment three 456, compartment five 460, and compartment one 452.

The administrator may program the sequence and the conditions for opening using an input device on the processing assembly device (not shown) or may perform the programming on a mobile device (not shown) and/or web application (not shown) which wirelessly connects to the processing device assembly (not shown). At any step in the process the administrator may manually unlock any of the compartments using a code input on the processing assembly device (not shown) and/or through a mobile device application (not shown) remotely which wirelessly connects to the processing device assembly (not shown).

Figure 2B:
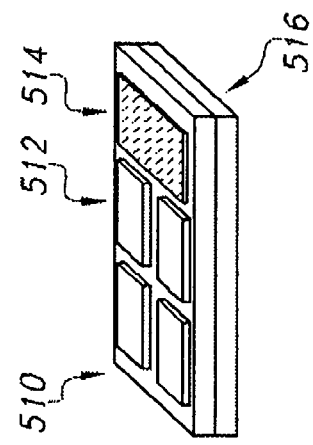
Figure 2D:
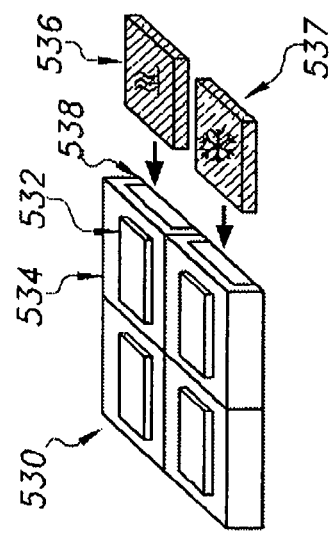
Figure 2A:
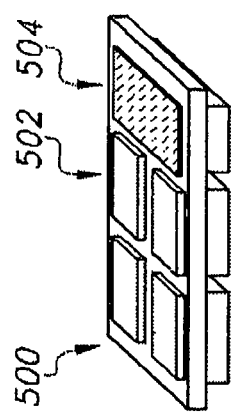

FIG. 2A is a side view of a container assembly with an open bottom 500. This container assembly has multiple compartments with top covers locked in place 502 and a processing assembly device with a display 504 where the user can interact with the device. In this embodiment the processing assembly device with a display 504 may be removable from the container assembly with an open bottom 500 for cleaning. The other sensor devices and wiring (not shown) may be encased in a watertight enclosure (not shown) for cleaning in a sink and/or dishwasher.

FIG. 2B is a side view of a container assembly with a closed bottom 510. This container assembly has multiple compartments with top covers locked in place 512 and a processing assembly device with a display 514 where the user can interact with the device. The bottom enclosure 516 may be watertight with a seal (not shown) to allow cleaning in a sink and/or dishwasher without harming the internal electronics. In alternate embodiments the bottom enclosure may be openable to remove the processing assembly device 514 prior to cleaning and may be available for the prevention of spills.

Figure 2C:
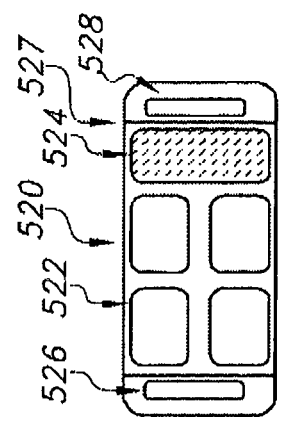

FIG. 2C is a top view of a container assembly with handles 520. This container assembly may serve as a tray containing at least two handles 526 and 528 to more easily carry the container. In some embodiments the handles 526 and 528 formed into the container assembly with handles. In alternate embodiments the handles 526 and 528 may removably connectable to the container assembly with handles 520. The container assembly with handles 520 has multiple compartments with top covers locked in place 522 and a processing assembly device with a display 524 where the user can interact with the device.

FIG. 2D is a side view of a container assembly with insulated compartments for temperature regulation 530. This container assembly may maintain the temperature within the compartments within certain ranges. In this embodiment the container assembly with insulated compartments for temperature regulation 530 contains multiple compartments with top covers locked in place 532 where each of the individual compartments may be surrounded by an insulating material (not shown). Within the individual compartments may be at least one slot 538 formed on at least one bottom and/or at least one side of the compartment where a heated material 536 and/or chilled material 537 may be inserted into the slot. The heated material 536 and chilled material 537 may be formed from a metal, stone, and/or a gel pack material (not shown). In alternate embodiments an electric heating and/or cooling device may be utilized (not shown). The container assembly with insulated compartments for temperature regulation 530 has multiple compartments with top covers locked in place 532 and a processing assembly device (not shown).

FIG. 2E is a side view of a container assembly shaped like a pill 590. This container assembly may keep the multiple compartments 596 and 597 locked so that the individual tiers cannot be removed from the stack until unlocked by the processing device assembly (not shown). In an exemplary embodiment this may allow different food types to be stored Which are insulated in different sections apart from one another such as having a cold salad within the bowl of the side compartment 596 and hot soup in the bowl on the side compartment 597, with bread, cheeses, and meats stored in the hatch compartment 594 in the middle section 592. In this embodiment the container assembly shaped like a pill 590 may contain at least one input device 598 which may control the processing device assembly (not shown).

FIG. 2F is a side view of a container assembly shaped like a flask for fluids 600. This container assembly may keep the multiple compartments 607 and 608 locked from the middle section 606 containing the locking assemblies (not shown) so that the user cannot access any section until unlocked by the processing device assembly (not shown). In an exemplary embodiment this may allow different types of drinks to be stored in the different sections which may be enjoyed separately and/or enjoyed together. This may allow for different and unique drink combinations such as at least one soda, at least one energy drink, and at least one alcoholic spirt, or offer complementary drink flavors such as coffee, hot chocolate, and chocolate syrup flavoring. In this embodiment a flavor packet 602 may be inserted using an insertion mechanism 604 into the middle section 606 allowing for one or more of the drink compartments to have a flavor enhancement and/or an experience enhancer such as insertion of a ball of dry ice.

FIG. 2G is a side view of a container assembly shaped like a rotating tray 610 which may be rotated around on a table. This container assembly may contain at least one swivel assembly 614 at the bottom and keep the multiple compartments 616 locked from the assembly body 612 containing the locking assemblies (not shown) so that the user cannot access any section until unlocked by the processing device assembly (not shown). Multiple input devices 618 may be positioned around the container assembly shaped like a rotating tray 610 which may control the processing device assembly (not shown). In an exemplary embodiment this may allow a group of people at a table to play a game which they spin the container assembly to randomize the choices, the users must tap onto the input devices 618 closest to them fastest, and answer a question or perform an action for the processing device assembly (not shown) to open a compartment 616 in front of the person who pressed the input device. Such an embodiment would be particularly useful and entertaining way for splitting appetizers between friends or family at the beginning of a meal.

FIG. 2H is a side view of a container assembly shaped like a board game 620. This container assembly may contain multiple compartments 622, 624, 625, 626, 627, 629, and 629 locked from various sections of the assembly. The user may start at a predefined location which may be a compartment 622 which after the material is removed may receive a clue. In an exemplary embodiment the container assembly contains food from a restaurant which may be for a single person or shared between a group of people working together where the board game format enhances the experience. Individualized board game units may be networked through the processing device assemblies (not shown) within the individual container assembly shaped like a board game 620 with other people at the same table, using a proximity sensor (not shown) and/or preprogrammed from the administrator (not shown) where they need to make decisions collectively and cooperate together to advance within the game. This may also provide a choose-your-own-adventure experience where decisions are made which compartments are unlocked which may influence the story of the game and gameplay in later stages. In this embodiment the user must decide between compartments 624 and 625 and must complete the contents of the compartment before moving onto the next stage. Punishments for getting questions wrong or not figuring out puzzles within a defined time period may result in a food challenge where a compartment containing unappetizing food must be completed to advance to the next stage of the game. The user may need to select the proper spices, sauces, or other materials which may accompany the meal based on clues, suggestions, or questions provided earlier in the game. In this embodiment the user selects one of two choices earlier in the game when selecting either compartment 624 or 625 and receives a clue. The user has the primary meal in compartment 626 but must select the correct sauce to complete in among the three compartments of 627. In some embodiments the user may only open one compartment. In other embodiments the user may open all three compartments but would need to completely remove all of the contents in that container to advance. After this choice is made the user advances to the final tower stages where additional compartments in the tower assembly 628 are located. In this embodiment based on the choices that were made in the game there are different compartments containing desserts in the final compartments in the tower assembly 628. The quality of the dessert is based on how well the user did with playing the game. In some embodiments the top compartment 629 is a physical item and/or toy as a prize instead of a food reward for successfully completing the game. The tower assembly 628 containing compartments may be modular allowing for different modules to be inserted to make the experience different each time allowing for repeat visits with new puzzles and experiences. The tower assembly 628 may also be removed prior to cleaning to make it easier. The container assembly shaped like a board game 620 may utilize LED lighting (not shown) to light the path the user is taking and may ask questions via a speaker which the user needs to speak into a microphone (not shown) or use another input device such as from their personal mobile device (not shown) which may be linked to the processing device assembly (not shown) within the game board. The puzzles may be adapted to the age and sophistication of the group that is looking for a challenge as part of the experience or simply easy access to the food to eat.

FIG. 2I is a side view of a container assembly where inserts may be loaded into 640. The container assembly is a base where pre-defined materials may be loaded into. In this embodiment the container assembly shaped where inserts may be loaded into 640 is used for a food challenge game among a group of people for an entertainment experience where the compartment inserts 642 are purchased from a store as a set. In this embodiment the food challenge is to guess the flavor from food that all looks the same such as from cookies, chocolates, chips, candies, cheeses, or other foods typically consumed at a party. When all the food is removed from a compartment and everyone in the group locks in their guesses either verbally into a microphone (not shown) or on their personal mobile device (not shown) then an input button (not shown) may be pressed and the answer may be displayed on a display device 644 on the container assembly where inserts may be loaded into 640. The compartment inserts 642 containing the pre-defined materials may contain a code which is read by the process assembly device (not shown) when the insert is inserted into the at least one compartment which may be displayed by the at least one display device 644 when all materials are removed from the insert. In other embodiments a simple text insert is inside a locked compartment which is revealed when the compartment inserts 642 are empty and the compartment containing the answer is unlocked by the processing assembly device (not shown). In these challenges the users are primarily blindfolded to prevent them from seeing the food packaging, the color differences, imprints, shapes, or other factors which may influence the guessing of what the flavors are. With this embodiment the food appearance itself is standardized where the contents, flavors, and/or additives are different, so a blindfold is not required which allows for a better experience interacting with a group in a social function setting such as at a Birthday party.

FIG. 2J is a side view of a container assembly with a soup/fondue set 650. The container assembly is a base where multiple locked compartments 654 are placed around a heated container 652 which may contain soup, fondue, melted cheese, melted chocolate, or cooking oil. In this embodiment the container assembly with a soup/fondue set 650 is used for a food challenge game among a group of people for an entertainment experience where they play "Fon-do or Fon-don't" where the compartments 654 are opened and people need to dip the materials into the heated container 652 and taste test them to determine if the go with the fondue or not. Foods such as breads, cheeses, vegetables, fruits, meats, and other options may be available in the locked compartments 654. In other embodiments the users in the groups need to answer questions to unlock the compartments 652 where more correct answers unlock compartments from the processing assembly device (not shown) containing more favorable foods to have with the fondue.

FIG. 2K is a side view of a container assembly with a pizza set 660. The container assembly is a base 662 which contains a central assembly containing pizza dough 666 and multiple locked compartments 664 containing toppings for the pizza. In this embodiment the container assembly with a pizza set 660 is used for a food challenge game among a group of people for an entertainment experience where they play the pizza challenge where the compartments 664 are unlocked based on the processing device assembly (not shown) and people need to add the toppings to their side of the pizza dough 664. Foods such as breads, cheeses, vegetables, fruits, meats, as well as other undesirable food options, such as sardines, gummy worms, and mayonnaise may be available in the locked compartments 664. In other embodiments the users in the groups need to answer questions to unlock the compartments 664 where more correct answers unlock compartments from the processing assembly device (not shown) containing more favorable foods to have with the pizza. After the game is complete and the toppings are added the pizza dough with all of the toppings may be cooked inside the container assembly with a pizza set 660 by inserting a heated material 668 underneath the pizza inside a slot (not shown) in the assembly and/or with an electrical heater which is plugged into a wall unit and cooked for a predetermined length of time when the top of the container 665 is closed and locked using a locking assembly (not shown) until complete. The container assembly with a pizza set 660 may contain insulated portions to protect the users, the processing assembly device (not shown), and the embedded sensors (not shown) from the heat during cooking.

FIG. 3A is a side view of an embodiment of a pre-packaged container assembly 700 containing multiple individual containers (702, 704, and 706) which may be broken off from the primary assembly and inserted into the compartments of the container assembly. The pre-packaged container assembly 700 individual containers (702, 704, and 706) may be formed and sized to fit within each of the individual compartments and locked into place using the at least one locking device (not shown). The pre-packaged container assembly 700 may be purchased from a store where they are stored at a single temperature, such as room temperature, refrigerated storage, and/or freezer storage. At home the individual containers may be stored at a common temperature or the individual containers (702, 704, and 706) may be stored under different conditions based on the package labeling. The package labeling on the individual containers may also contain instructions for food preparation such as heating of the individual container 702, refrigeration of the individual container 704, or the freezing of the individual container 706. Other preparations may include microwaving, baking, toasting, mixing, shaking, refrigeration, and/or freezing.

FIG. 3B is a side view of an embodiment of a pre-packaged container assembly 700 containing multiple individual containers 712 stacked in a sequence for loading directly into the compartments of a container dispensing unit. The multiple individual containers 712 may be stacked into at least one frame 714 which will hold the individual containers in place for sale, transport, and convenience in loading into the container assembly compartments prior to locking and dispensing.

FIG. 3C is a side view of a pre-packaged container assembly 720 which may contain the locked compartments 722 and 724 which unlock in a pre-determined sequence. These pre-packaged assemblies may be formed from disposable or recyclable materials and be discarded and/or recycled after use. The pre-packaged container assembly allows for an easy to dispense container assembly system without requiring a specialized container assembly system purchased separately to load the pre-packaged containers into.

FIG. 3D is a side view of an embodiment of a pre-packaged container 730 containing at least one disposable sensor device 732 which is inserted into a formed locking compartment 734 which contains the connection for the at least one disposable sensor device 736 Which may communicate data back to the processing device (not shown) to report the state of the individual container 730 to the container assembly system (not shown). In this embodiment the at least one disposable sensor device 732 is located underneath the individual container 730 lid along the lip. The individual container may be expertly formed so that it is keyed to only fit into the locking compartment 734 in a single direction so that the at least one disposable sensor device 732 inserts into the connection for the at least one disposable sensor device 736. After this connection between one disposable sensor device 732 and the connection for the at least one disposable sensor device 736 the sensor is activated, potentially by providing a power source or turning on an external battery source and can communicate the state of the individual container 730. This may include the state of the lid on top of the individual container 730 such as if the lid is removed the one disposable sensor device 732 as a light sensor detects light and is able to confirm the lid (not shown) has been successfully removed from the individual container 730. This may be communicated back to the processing device (not shown) through the connection for the at least one disposable sensor device 736. In other embodiments the at least one disposable sensor device 732 may determine if the individual container 730 is properly aligned into the compartment 734 (contact sensor), if the individual container 730 has been removed from the compartment 734 (contact sensor or light sensor), if the contents were discards by tipping them at an angle (tilt sensor or accelerometer), if the contents of the individual container 730 were completely removed (light sensor, camera, or acoustic sensor), or the temperature of the contents inside of the individual container 730 (thermal sensor).

FIG. 3E is a side view of an embodiment of a pre-packaged container 740 which is inserted into a thermal regulating container 742 prior to insertion into the formed locking compartment 744. The thermal regulating container 742 may be formed from insulating materials which help prevent the loss of heat or cooling within the assembly. In alternate embodiments the thermal regulating container 742 may be jacketed and contain a gel or fluid matrix which can be heated and/or cooled to maintain the temperature longer. This thermal regulating container 742 may be stored in a freezer, like a cold pack to maintain cool temperatures for the individual container 740 or may be heated in a microwave or under hot water to keep the items stored in the individual container 740 warmer for longer periods of time.

FIG. 4A is a front view of the dispensing unit for pre-packaged containers 800. This unit contains a main body 802 formed to contain multiple individual food containers in sequence. This main body may be in the locked state where the user cannot access the individual prepackaged containers containing the food until the previous one has been completed and they are dispensed in a predetermined sequence. The main body 802 may contain a mobile device holder 804. This main body 802 may be in the form of a character or branded item containing an identity the user likes and that the contents of the individual containers may be associated with. This may include a hero or a doll that the user associates with certain food types and healthy eating habits. In this embodiment the dispensing occurs from a single dispensing compartment 806 where the locking device is unlocked allowing access to open the individual container. In this embodiment the character is a robot that has a moveable head 808 which can be pushed down to dispense the individual food containers into the single dispensing compartment 806 below which pulls out like a drawer so the user can access the contents inside of the individual pre-packaged container. This single dispensing compartment 806 may be locked using a locking device (not shown) until the sequence is initiated and the process begins. This may include an initiation from a mobile device (not shown) in an application linked to the dispensing unit for pre-packaged containers 800, a button (not shown) hidden within the body of the device, or an input device like a keypad to type in a code (not shown). In alternate embodiments the dispensing and/or access to open the individual containers may come from multiple points of compartments unlocking.

FIG. 4B is a side view of the dispensing unit for pre-packaged containers 800 where the side of the main body 802 is unlocked using a key (not shown), a button (not shown), a code (not shown), or a command from a mobile device (not shown). Once the main body is opened multiple pre-packaged individual containers 810 and 820 may be inserted into the interior slots in sequence. In this embodiment the sequence of the stacking is the sequence that the individual containers are dispensed.

FIG. 4C is a side view of the dispensing unit for pre-packaged containers 800 where the mobile device holder 804 may be available on the main body to hold at least one mobile device. To keep the user engaged in learning, studying, quizzes, or video conferencing with other friends as a social engagement during eating a mobile device holder 804' may be available to place a mobile device 812 onto the body of the unit which may additionally serve as a control unit for the dispensing unit for pre-packaged containers 800.

FIG. 4D is a side view of the dispensing unit for pre-packaged containers 800 with the single dispensing compartment 806' is unlocked and the user is able to open the drawer by pulling it forward where the compartment is in the opened state and the individual container 810' is accessible to initiate consumption of the contents inside.

FIG. 4E is a side view of the dispensing unit for pre-packaged containers 800 where the top lid 814 of the pre-packaged individual container 810" is removed exposing at least one sensor device 816 that provides data on the state of the container to the processing device. In this embodiment the top lid 814 is a peel off lid made of foil or other material which blocks out light. The at least one sensor device 816 is a light sensor which detects when the top lid 814 is removed and initiates a timer for the sequence to determine how long it takes between the opening of the lid and the consumption of all the contents inside based on a light sensor (not shown) underneath the transparent bottom of the pre-packaged individual container 810". The at least one sensor device 816 may be disposable and part of the pre-packaged individual container 810" or it may be expertly formed as part of the locked compartment and be reusable.

FIG. 4F is a side view of the dispensing unit for pre-packaged containers 800 where the contents of the pre-packaged individual container 810" are fully removed as determined from the sensor (not shown) underneath the transparent bottom of the pre-packaged individual container 810", located either reusable in the compartment below or disposable as part of the individual container. This sends the current state of the pre-packaged individual container 810" to the processing device (not shown) which may allow for the removal of the individual container 810" from the single dispensing compartment 806. There may be a physical lock using a locking device (not shown) where the contents of the individual container 810" must be completed before the locking mechanism is unlocked and opened releasing the individual container 810" so that it may be removed. In alternate embodiments there may simply be a sensor which may communicate the state that the individual container was removed prematurely and may sound an alarm or in alternate embodiments record that the event occurred where it was removed which may result in the forfeiture of the rewards associated with successful completion of the meal. In this embodiment as the pre-packaged individual container 810" is removed from the assembly at least one sensing device 818 located in the single dispensing compartment 806' detects that the pre-packaged individual container 810' was removed and sends the data about the state of the compartment back to the processing device (not shown).

FIG. 4G is a side view of the dispensing unit for pre-packaged containers 800 where the single dispensing compartment 806" is in the empty state and is manually closed by the user. The processing device (not shown) determines the state of the compartment is that the previous contents were fully consumed and that the pre-packaged individual container 810" was removed, that it is currently in the empty state, and that the single dispensing compartment 806" is closed ready to receive the next individual container in sequence.

FIG. 4H is a side view of the dispensing unit for pre-packaged containers 800 where the current empty state of the single dispensing compartment 806" allows the processing device (not shown) to send a command to unlock the spring-loaded movable head 808' where the user manually pushes down on the movable head 808' to push the next individual container in sequence 820 into the single dispensing compartment 806" below using an attachment mechanism (not shown) which is released when the pre-packaged individual container 820 is inserted into the single dispensing compartment 806".

FIG. 4I is a side view of dispensing unit for pre-packaged containers 800 where the spring-loaded movable head 808" retracts into position after the pre-packaged individual container 820' has been properly dispensed into the compartment below. This sequence unlocks the single dispensing compartment 806' which is manually pulled open allowing for the pre-packaged individual container 820' to be accessed and consumed repeating the process until all of the prepackaged individual containers are completely consumed. After this the processing device may provide a full report to the administrator with the timestamps and graphs of each step in the process, how long it took to consume the contents of each individual container and how long overall. A score may be given based on the processing of the data and rewards may be provided based on the outcome of the scores. This data may also be shared with a doctor, pediatrician, or nutritionist for a professional analysis of improving various eating habits, including patients with autism, on the autism spectrum, picky eaters that have a lack of variety or nutritious foods, or those with eating disorders. The data may also be used by the food packaging companies to make improvements in recipes and packaging for their pre-packaged. containers.

FIG. 5A is a side view of a container assembly 900 where the locked compartments open from the inside of the primary container to dispense food products such as toppings, sauces, and/or food enhancers onto the top of a food base located in the primary compartment. In this embodiment the container assembly 900 includes a top portion 902 and a bottom portion 904 which opens like a clamshell along at least one hinge 918. At least one locking device 910 is used to keep the primary container closed while the contents are being dispensed inside. A rotatable section with multiple compartments 906 each contains a different food topping for the food base located within the primary container. A dispensing device housing 908 may be connected to the top rotatable section with multiple compartments 906 where an actuating motor may push the contents of each of the compartments within the rotatable section with multiple compartments 906 when the compartments are unlocked and open into the interior of the primary container. A processing device (not shown) sends commands based on pre-determines sequences on which compartments to open and what foods to dispense based on the sequences and rules programmed into the processing device. This may be utilized for different food bases such as toppings on a salad where croutons, fruits, salad dressings, nuts, vegetable toppings or other items may be dispensed on top of a salad base.

In alternate examples pancakes or waffles may be the food base where different flavored syrups, fruits, chocolates, and other toppings may be added. In other alternate examples the food base may be a liquid like coffee where different flavorings are added between sips to combine into different flavor profiles.

FIG. 5B is a side view of container assembly goo where the locked compartments open from the inside of the primary container, where the dispensing device housing 908 contains an actuating motor assembly where a power source, such as a rechargeable battery (not shown) powers the motor to actuate a bar with a different shaped heads 913 that pushes on the contents in each of the rotatable section with multiple compartments 906 chambers and pushes them through an internal unlockable opening below the compartments. The actuating bar at the end of the motor assembly 912 in some embodiments may push on a deformable plastic container such as a sauce pack or other squeezable container with a dispenser at one end pointed downward. When the internal compartment is unlocked and opened to the interior of the container the actuating bar at the end of the motor assembly 912 can push on the deformable container to squeeze out the fluids into the inside of the primary container. This may additionally be utilized to push various solid contents into the primary container. The actuator bar arm may contain different shaped heads 913 depending on the types of the materials to dispense into the interior of the container. The container assembly may contain at least one hinge 918 to open the up the primary container to gain access to the contents inside after the toppings and/or flavorings have been dispensed. In some embodiments the primary container may contain a rotating interior tray 920, which may be motorized using a motor (not shown) and a power source (not shown), preferably a battery power source (not shown) to allow the toppings to be dispensed into different parts of the food base so that flavors do not mix in the same place.

FIG. 5C is a side view of container assembly 900 where the locked compartments open from the inside of the primary container, where the primary container locking device is in the unlocked state 910' and the top portion 902' of the container assembly is open along the at least one hinge 918. The rotatable section with multiple compartments 906' contains different food products, toppings, and flavorings within the different compartments and the actuator motor 912' pushes on the contents of the compartments through an unlocked and open compartment 914 based on the commands of the processing device (not shown). In this embodiment a single actuator motor is located on one side and the rotatable section with multiple compartments 906' can rotate into place utilizing a motor (not shown) to dispense the contents of the compartments one at a time through a single unlocked internal compartment in the opened state. In other embodiments multiple internal compartments may be unlocked and multiple dispensing motors may be utilized as part of the design. In alternate embodiments the rotating of the rotatable section with multiple compartments 906' may be manually turned to position a certain compartment into position and the user may need to manually push the materials inside each of the compartments by shaking the container at an angle, using a pushing tool or a manual crank, but the compartments remain locked and closed until they are commanded to be unlocked and opened by the processing device. The rotatable section with multiple compartments 906' may be formed from a transparent material so the user can view the contents of the toppings going into the primary chamber and on top of the food base. In alternate embodiments the rotatable section with multiple compartments 906' may be formed by an opaque material where the contents of the compartments are visually obscured from the user where they are surprised at the contents as they are dispensed.

FIG. 5D is a side view of container assembly 900 where the locked compartments open from the inside of the primary container, where the internal unlockable opening 914 is open to the interior and the contents of the individual compartment are dispensed onto the food base with a certain distribution range 922. The size, angle, and shape of the internal unlockable opening 914 as well as the shape of the overall interior of the container may influence the distribution range of the materials being dispensed. In alternate embodiments dispensing fluids may contain different shaped dispensing heads to increase or decrease the distribution range, volume, and droplet size the fluid is dispensed depending on the viscosity and volume of the fluids being dispensed. The processing device (not shown) may communicate with an external mobile device 924 to determine the sequencing and the rules for dispensing the material contents in the compartments onto the food base.

FIG. 5E is a side view of an alternate embodiment of a container assembly 930 where the primary chamber contains multiple compartments (934, 936, 938, and 940). This may be utilized in the case of a single food base where multiple individual foods are utilized with a single topping adding. Such as with chicken nuggets and sauces or waffles and a single syrup or topping used with each individual sized piece. In this embodiment each of the multiple compartments (934, 936, 938, and 940) in the primary chamber contains a single piece of the food base. The rotatable section with multiple compartments 944 and the motor assembly 946 through an internal unlockable opening 948. This may be a new way to enjoy familiar foods with different toppings you may not have been willing to try before. It is also a way that fast-food and fast casual dining can enhance their experiences to customers.

LIST OF REFERENCE SIGNS

100 Container assembly
102 Base
104 Compartment
106 Bottom
108 Top cover
110 Rod or pin
112 Swivel attachment
114 Well
116 Spring
118 Spring
120 Locking assembly
122 Primary hook
124 Stationary hook
126 Light sensor array
128 Light emitting diode (LED) device
150 Compartment
152 Bottom
154 Top cover
156 Spring assembly
158 Spring slot
160 Rod or pin
162 Swivel attachment
164 Swivel attachment
166 Locking assembly
168 Primary lock hook
170 Stationary lock hook
172 Light sensor array
174 Light detectors
176 Camera
180 Processing device assembly
182 Processing device
184 Power device
186 Memory storage device
188 Communication device
190 Display device
192 Microphone
194 Speaker device
196 Inductive connection on the processing device
198 Inductive connection on the container assembly
200 Transparent window and/or area
202 Wiring 204 Sensor device
206 Bottom enclosure
208 Material modifier device
300 Compartment
302 Light sensor array
304 Piece of food (broccoli)
306 Piece of food (broccoli)
310 Darkened light sensors in group
312 Clear light sensors
314 Light sensor partially covered
316 Darkened light sensors in group
320 Container assembly
322 Compartment one
324 Compartment two
326 Compartment three
328 Compartment four
330 Compartment five
332 Compartment six
500 Container assembly with an open bottom
502 Compartments with top covers locked in place
504 Processing assembly device with a display
510 Container assembly with a closed bottom
512 Compartments with top covers locked in place
514 Processing assembly device with a display
516 Bottom enclosure
520 Container assembly with handles
522 Compartments with top covers locked in place
524 Processing assembly device with a display
526 Handle
528 Handle
530 Container assembly with insulated compartments for temperature regulation
532 Compartments with top covers locked in place
534 Insulating material
536 Heated material
537 Chilled material
538 Slot
590 Container assembly shaped like a pill
592 Middle section
594 Hatch compartment
596 Side compartment
597 Side compartment
598 input device
600 Container assembly shaped like a flask for fluids
602 Flavor packet
604 Insertion mechanism
606 Middle section
607 Compartment
608 Compartment
610 Container assembly shaped like a rotating tray
612 Assembly body
614 Swivel assembly
616 Compartments
618 Input devices
620 Container assembly shaped like a board game
622 Start compartment
624 Decision compartment
625 Decision compartment
626 Primary meal compartment
627 Decision compartment
628 Tower assembly
629 Top compartment
640 Container assembly where inserts may be loaded into
642 Compartment inserts
644 Display device
650 Container assembly with a soup/fondue set
652 Heated container
654 Compartments
660 Container assembly with a pizza set
662 Base
664 Compartments
665 Top of the container (container lid)
666 Pizza dough
668 Heated material
700 Pre-packaged container assembly
702 Heating of the individual container
704 Refrigeration of the individual container
706 Freezing of the individual container
710 Pre-packaged container assembly
712 Multiple individual containers
714 At least one frame
720 Pre-packaged container assembly
722 Locked compartments
724 Locked compartments
730 Pre-packaged container
732 At least one disposable sensor device
734 Formed locking compartment
736 Connection for the at least one disposable sensor device
740 Pre-packaged container
742 Thermal regulating container
744 Formed locking compartment
800 Dispensing unit for pre-packaged containers
802 Main body
804 Mobile device holder
806 Single dispensing compartment
808 Movable head
810 Pre-packaged individual containers
812 Mobile device
814 Top lid
816 At least one sensor device
818 At least one sensing device
820 Pre-packaged individual containers
900 Container assembly
902 Top portion
904 Bottom portion
906 Rotatable section with multiple compartments
908 Dispensing device housing
910 Primary container locking device
912 Motor assembly
913 Different shaped heads
914 Unlocked and open compartment
916 Rotating base for the rotatable section with multiple compartments
918 At least one hinge
920 Rotating interior tray
922 Distribution range
924 Mobile device
930 Container assembly
932 Top portion
934 Multiple compartments
936 Multiple compartments
938 Multiple compartments
940 Multiple compartments
944 Rotatable section with multiple compartments
946 Motor assembly
948 Unlocked and open compartment

We claim:

1. A container assembly comprising:
at least one formed enclosure of the container assembly;
wherein the at least one formed enclosure contains at least one compartment enclosed by at least one lock assembly;

wherein the at least one compartment contains at least one side wall and at least one bottom with at least one opening;

wherein the at least one opening is enclosed by at least one barrier which is locked by the at least one lock assembly making the at least one compartment inaccessible to a user until the at least one lock assembly is unlocked and the barrier is removed;

wherein the at least one lock assembly consists of at least one attachment mechanism which is unlocked based on a decision from the at least one processing device which is connected to at least one sensor device and at least one input device;

wherein the processing assembly device makes a decision to unlock the at least one lock assembly based on a set of programmed parameters;

wherein the set of programmed parameters include the at least one sensor device detecting a removal of all material from a previous compartment of the at least one compartments, an input by the user on the at least one input device, a directed action from an external input device, and/or a preprogrammed internal decision by the at least one processing assembly device using at least one timer and/or an opening of an initial compartment of the at least one compartments;

wherein the at least one lock assembly unlocks the at least one compartment in a predetermined sequence programmed into the at least one processing assembly device based on the set of programmed parameters.

2. The container assembly of claim 1, wherein the at least one attachment mechanism comprises a latch, a hook, a bar, a clamp, a magnet, or an electromagnet.

3. The container assembly of claim 1, wherein the at least one processing assembly device comprises at least one processing device, at least one power device, at least one memory storage device, at least one communication device, and/or at least one display device.

4. The container assembly of claim 3, wherein the at least one processing assembly device is at least one mobile device which is removably connected to the container assembly.

5. The container assembly of claim 3, wherein the at least one display device comprises at least one light emitting diode (LED), at least one light emitting diode (LED) array, at least one liquid crystal display (LCD) display, at least one OLED display, at least one augmented reality display, at least one virtual reality display, at least one mixed reality display, at least one holographic display, at least one spatial computing display, at least one 3D display a speaker device, a vibrational motor, a tactile surface, an inflating balloon, or a combination thereof.

6. The container assembly of claim 3, wherein the at least one display device is viewed through at least one display window in the container assembly, an External Mobile device plug-in, or a touch screen accessible.

7. The container assembly of claim 3, wherein the at least one processing device is programmed to unlock the at least one compartments in the predetermined sequence based on data from the at least one sensor device using in a playing a game, an entertainment of the user and/or a group, a defined challenge, and/or a gamified experience in using the container assembly and/or material contents within the at least one compartments.

8. The container assembly of claim 7, wherein said playing the game comprises a board game where the user follows a set of rules;
wherein the user moves across the board game in the container assembly and/or the at least one display device, wherein the at least one display device contains at least one board and/or at least one board element;
wherein the user makes at least one decision that influences an outcome of the game;
wherein the board game contains at least one random element; and
wherein the user receives punishments and/or rewards during the game.

9. The container assembly of claim 7, wherein the user performs a game competing against a score, a recorded measured value, another user, a networked user, a computer device, and/or an artificial intelligence which is monitored by the at least one sensor device and/or the at least one processing device.

10. The container assembly of claim 3, wherein the at least one processing device is programmed to unlock the at least one compartments in the predetermined sequence based on a schematic and/or a plan to assemble materials within the at least one compartments in a defined sequence.

11. The container assembly of claim 1, wherein the at least one input device comprises at least one button, at least one keyboard, at least one touchscreen display, at least one microphone, at least one controller, at least one joystick, at least one motion controller, at least one depth scanner, and/or at least one external input device.

12. The container assembly of claim 1, wherein the at least one sensor device comprises a light sensor, a time-of-flight sensor, a 3D depth sensor, an acoustic sensor, an ultrasound sensor, a radio frequency sensor, and/or a camera sensing device.

13. The container assembly of claim 3, wherein the at least one container assembly is a watertight enclosure which protects the at least one processing device assembly, the at least one display device, the at least one sensor device, and at least one wired connection, from cleaning or fluid materials in the at least one compartments.

14. The container assembly of claim 1, wherein the at least one compartments contains at least one insulating material and/or insulating design to insulate material contents within the at least one compartments from temperature changes, to maintain a temperature of the material contents in a hot, cold, or neutral temperature, and/or to maintain the temperature from a heating and/or cooling element.

15. The container assembly of claim 1, further comprising at least one food modifier device which is an element that changes and/or adds material to the material contents within the at least one compartments, wherein the at least one food modifier comprises a mixing element, a blending element, a cutting element, a forming element, an extrusion element, an injection element, and/or a printing element.

16. The container assembly of claim 1, wherein the at least one compartments comprises pre-packaged containers formed to fit into the at least one compartments ([0047]); wherein each of the pre-packaged containers comprises a disposable sensor which interface with a corresponding compartment to determine a state of the corresponding container.

* * * * *